United States Patent
Son et al.

(10) Patent No.: US 11,526,763 B2
(45) Date of Patent: Dec. 13, 2022

(54) NEUROMORPHIC SYSTEM FOR PERFORMING SUPERVISED LEARNING USING ERROR BACKPROPAGATION

(71) Applicants: SK hynix Inc., Icheon (KR); POSTECH ACADEMY-INDUSTRY FOUNDATION, Pohang (KR)

(72) Inventors: Hyunwoo Son, Pohang (KR); Jae-Yoon Sim, Pohang (KR)

(73) Assignees: SK hynix Inc., Icheon (KR); POSTECH ACADEMY-INDUSTRY FOUNDATION, Pohang (KR)

( * ) Notice: Subject to any disclaimer, the term of this patent is extended or adjusted under 35 U.S.C. 154(b) by 677 days.

(21) Appl. No.: 16/672,253

(22) Filed: Nov. 1, 2019

(65) Prior Publication Data

US 2020/0202217 A1 Jun. 25, 2020

(30) Foreign Application Priority Data

Dec. 19, 2018 (KR) .................. 10-2018-0164780

(51) Int. Cl.
*G06N 3/04* (2006.01)
*G06N 3/06* (2006.01)
*G06N 3/08* (2006.01)
*G06N 3/063* (2006.01)

(52) U.S. Cl.
CPC .......... *G06N 3/084* (2013.01); *G06N 3/0445* (2013.01); *G06N 3/0635* (2013.01)

(58) Field of Classification Search
CPC ..... G06N 3/0445; G06N 3/0635; G06N 3/084
See application file for complete search history.

(56) References Cited

U.S. PATENT DOCUMENTS

2017/0011290 A1* 1/2017 Taha .................... G06N 3/0635
2017/0364801 A1   12/2017 Kim et al.
2019/0325291 A1* 10/2019 Gokmen .............. G06N 3/0454
(Continued)

FOREIGN PATENT DOCUMENTS

KR        20180044295 A     5/2018

OTHER PUBLICATIONS

Hasan, Raqibul, and Tarek M. Taha. "Enabling back propagation training of memristor crossbar neuromorphic processors." 2014 International Joint Conference on Neural Networks (IJCNN). IEEE, 2014. (Year: 2014).*

(Continued)

*Primary Examiner* — Hal Schnee (57) ABSTRACT

A neuromorphic system includes a first neuromorphic layer configured to perform a forward operation with an input signal and a first weight, a first operation circuit configured to perform a first operation on a result of the forward operation of the first neuromorphic layer, a second neuromorphic layer configured to perform a forward operation with an output signal of the first operation circuit and a second weight, a second operation circuit configured to perform a second operation on a result of the forward operation of the second neuromorphic layer, a first weight adjustment amount calculation circuit configured to calculate a first weight adjustment amount, and a second weight adjustment amount calculation circuit configured to calculate a second weight adjustment amount.

19 Claims, 9 Drawing Sheets

(56) References Cited

U.S. PATENT DOCUMENTS

2021/0397968 A1* 12/2021 Thiele .................. G06N 3/084

OTHER PUBLICATIONS

Bamford, et al., "Spike-Timing-Dependent Plasticity With Weight Dependence Evoked From Physical Constraints," IEEE Transactions on Biomedical Circuits and Systems, Aug. 2012, vol. 6, No. 4, pp. 385-398.
Cho, et al., "An On-Chip Learning Neuromorphic Autoencoder With Current-Mode Transposable Memory Read and Virtual Lookup Table," IEEE Transactions on Biomedical Circuits and Systems, Feb. 2018, vol. 12, No. 1, pp. 161-170.
Courbariaux, et al., "BinaryNet: Training Deep Neural Networks with Weights and Activations Constrained to +1 or −1," arrXiv: 1602.02830V1 [cs.LG], Feb. 2016, pp. 1-9.
Gonugondla, et al., "A 42pJ/Decision 3.12TOPS/W Robust In-Memory Machine Learning Classifier with On-Chip Training," ISSCC 2018 / SESSION 31 / Computation in Memory for Machine Learning / 31.2, Feb. 2018, pp. 490-492.
Khwa, et al., "A 65nm 4Kb Algorithm-Dependent Computing-in-Memory SRAM Unit-Macro with 2.3ns and 55.8TOPS/W Fully Parallel Product-Sum Operation for Binary DNN Edge Processors," ISSCC 2018 / SESSION 31 / Computation in Memory for Machine Learning / 31.5, Feb. 2018, pp. 496-498.
Whatmough, et al., "A 28nm SoC with a 1.2GHz 568nJ/Prediction Sparse Deep-Neural-Network Engine with >0.1 Timing Error Rate Tolerance for IoT Applications," ISSCC 2017 / SESSION 14 / Deep-Learning Processors / 14.3, Feb. 2017, pp. 242-244.

* cited by examiner

NEUROMORPHIC SYSTEM FOR PERFORMING SUPERVISED LEARNING USING ERROR BACKPROPAGATION

CROSS-REFERENCE TO RELATED APPLICATION

The present application claims priority under 35 U.S.C. § 119(a) to Korean Patent Application No. 10-2018-0164780, filed on Dec. 19, 2018, which is incorporated herein by reference in its entirety.

BACKGROUND

1. Technical Field

Various embodiments relate to a neuromorphic system for performing supervised learning, and more particularly, to a neuromorphic system for performing supervised learning using error backpropagation.

2. Related Art

Energy efficient hardware technology is required in computing devices with artificial intelligence (AI). In particular, a neuromorphic system is being researched as one of energy efficient technologies.

The neuromorphic system is a semiconductor circuit implementing an artificial neural network that mimics a brain of an organism. In the neuromorphic system, nodes form a network by synaptic coupling and have an arbitrary problem-solving ability by changing weight values of synapses through proper learning.

In order to utilize a neuromorphic system in various technical fields, there is a demand for technology capable of efficiently training the neuromorphic system.

SUMMARY

In accordance with an embodiment of the present disclosure, a neuromorphic system may include a first neuromorphic layer configured to perform a forward operation with an input signal and a first weight; a first operation circuit configured to perform a first operation on a result of the forward operation of the first neuromorphic layer; a second neuromorphic layer configured to perform a forward operation with an output signal of the first operation circuit and a second weight; a second operation circuit configured to perform a second operation on a result of the forward operation of the second neuromorphic layer; a first weight adjustment amount calculation circuit configured to calculate a first weight adjustment amount based on the input signal, the output signal of the first operation circuit, and a result of a backward operation circuit performed by the second neuromorphic layer, the backward operation being performed with a target signal corresponding to the input signal, an output signal of the second operation circuit, and the second weight; and a second weight adjustment amount calculation circuit configured to calculate a second weight adjustment amount based on the target signal corresponding to the input signal, the output signal of the second operation circuit, and the output signal of the first operation circuit.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments that include various features, and explain various principles and beneficial aspects of those embodiments.

DETAILED DESCRIPTION

Various embodiments will be described below with reference to the accompanying figures. Embodiments are provided for illustrative purposes and other embodiments that are not explicitly illustrated or described are possible. Further, modifications can be made to embodiments of the present disclosure that will be described below in detail.

Figure 1:
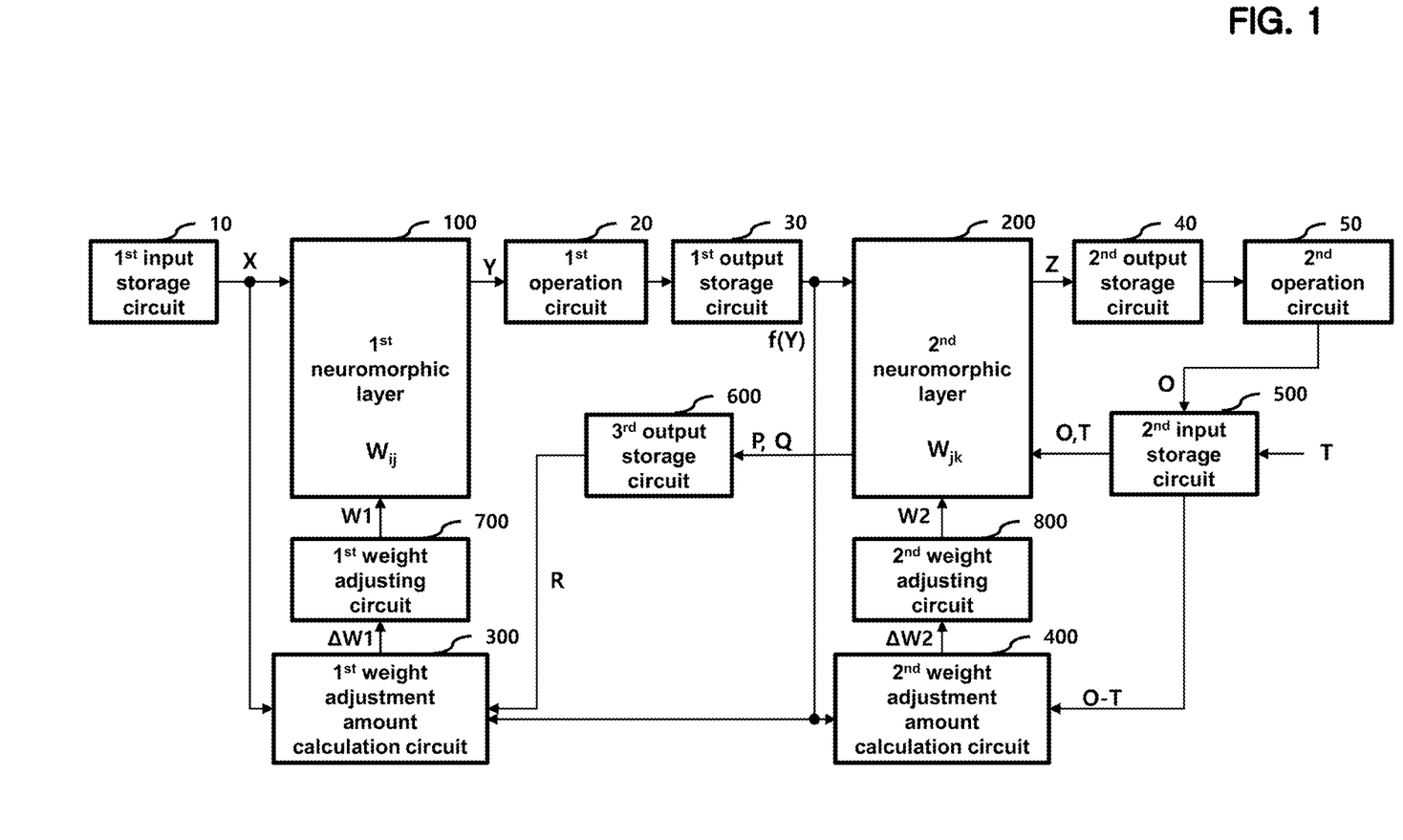
FIG. 1 illustrates a neuromorphic system according to an embodiment.

FIG. 1 illustrates a neuromorphic system according to an embodiment. The neuromorphic system includes a first neuromorphic layer 100 and a second neuromorphic layer 200.

The first neuromorphic layer 100 and the second neuromorphic layer 200 may have substantially the same configuration, and may perform forward and backward operations. This will be described in detail below.

According to an embodiment of the present disclosure, the neuromorphic system further includes a first input storage circuit 10 for storing a forward input signal X to be provided to the first neuromorphic layer 100, a first operation circuit 20 for performing a first operation on a forward computation result Y output from the first neuromorphic layer 100, and a first output storage circuit 30 for storing a signal f(Y) output from the first operation circuit 20.

When performing supervised learning using a batch input signal including a plurality of batch inputs, the first input storage circuit 10 stores the plurality of batch inputs and sequentially provides the plurality of batch inputs as the forward input signal X to the first neuromorphic layer 100, each of the batch inputs corresponding to a batch index. A batch index is assigned to each of the plurality of batch inputs.

In the present embodiment, the first operation performed by the first operation circuit 20 is a rectified linear unit (ReLU) operation which is a nonlinear operation. Since the ReLU operation itself is well known, a detailed description thereof is omitted.

When the supervised learning is performed using an n-th batch input among the plurality of batch inputs in the batch input signal, the first output storage circuit 30 may sequentially store an output of the first operation circuit 20 corresponding to an n-th batch index, n being a natural number.

The output of the first output storage circuit 30 is provided as a forward input signal of the second neuromorphic layer 200.

According to an embodiment of the present disclosure, the neuromorphic system further includes a second output storage circuit 40 for storing a forward operation result Z output from the second neuromorphic layer 200, a second operation circuit 50 for performing a second operation on an output of the second output storage circuit 40, a second input storage circuit 500 for storing an output O of the second operation circuit 50 and a target T, and a third output storage circuit 600 for storing a result of the backward operation of the second neuromorphic layer 200.

When the supervised learning is performed using the batch input signal, the second output storage circuit 40 may sequentially store results of the forward operation of the second neuromorphic layer 200 corresponding to the plurality of batch inputs in the batch input signal.

In the present embodiment, the second operation performed by the second operation circuit 50 is a Softmax operation. The Softmax operation itself is well known, and thus a detailed description thereof is omitted.

A target T may be referred to as a label L that is a value corresponding to a correct answer that corresponds to the n-th batch input when the supervised learning is performed using the n-th batch input.

When performing the supervised learning using the batch input signal, there are a plurality of targets respectively corresponding to the plurality of batch inputs of the batch input signal. In this case, the second input storage circuit 500 may sequentially store the plurality of targets respectively corresponding to the plurality of batch inputs. In addition, the second input storage circuit 500 may sequentially store the outputs of the second operation circuit 50 corresponding to the plurality of batch inputs.

When performing the supervised learning using the n-th batch input, the third output storage circuit 600 may store a first backward operation result P and a second backward operation result Q, and output an error backpropagation signal R that corresponds to a difference between the first backward operation result P and the second backward operation result Q. The first backward operation result P is output from the second neuromorphic layer 200 by providing an output O of the second operation circuit 50 as a first backward input of the second neuromorphic layer 200. The second backward operation result Q is output from the second neuromorphic layer 200 by providing the target T corresponding to the n-th batch input as a second backward input of the second neuromorphic layer 200.

According to an embodiment of the present disclosure, the neuromorphic system further includes a first weight adjustment amount calculation circuit 300 and a first weight adjusting circuit 700. The first weight adjustment amount calculation circuit 300 calculates a first adjustment amount ΔW1 for a first weight W1 stored in the first neuromorphic layer 100 based on the output X of the first input storage circuit 10, i.e., the forward input signal X, the signal f(Y) output from the first output storage circuit 30, and the error backpropagation signal R output from the third output storage circuit 600. The first weight adjusting circuit 700 adjusts the first weight W1 of the first neuromorphic layer 100 based on the first adjustment amount ΔW1 output from the first weight adjustment amount calculation circuit 300.

In the present embodiment, the first weight W1 may have a matrix structure including a plurality of weight elements.

According to an embodiment of the present disclosure, the neuromorphic system further includes a second weight adjustment amount calculation circuit 400 and a second weight adjusting circuit 800. The second weight adjustment amount calculation circuit 400 calculates a second adjustment amount ΔW2 for a second weight W2 stored in the second neuromorphic layer 200 based on the signal f(Y) output from the first output storage circuit 30, and an output (O−T) from the second input storage circuit 500. The second weight adjusting circuit 800 adjusts the second weight W2 of the second neuromorphic layer 200 based on the second adjustment amount ΔW2 output from the second weight adjustment amount calculation circuit 800.

In the present embodiment, the second weight W2 may be have a matrix structure including a plurality of weight elements.

Figure 9:
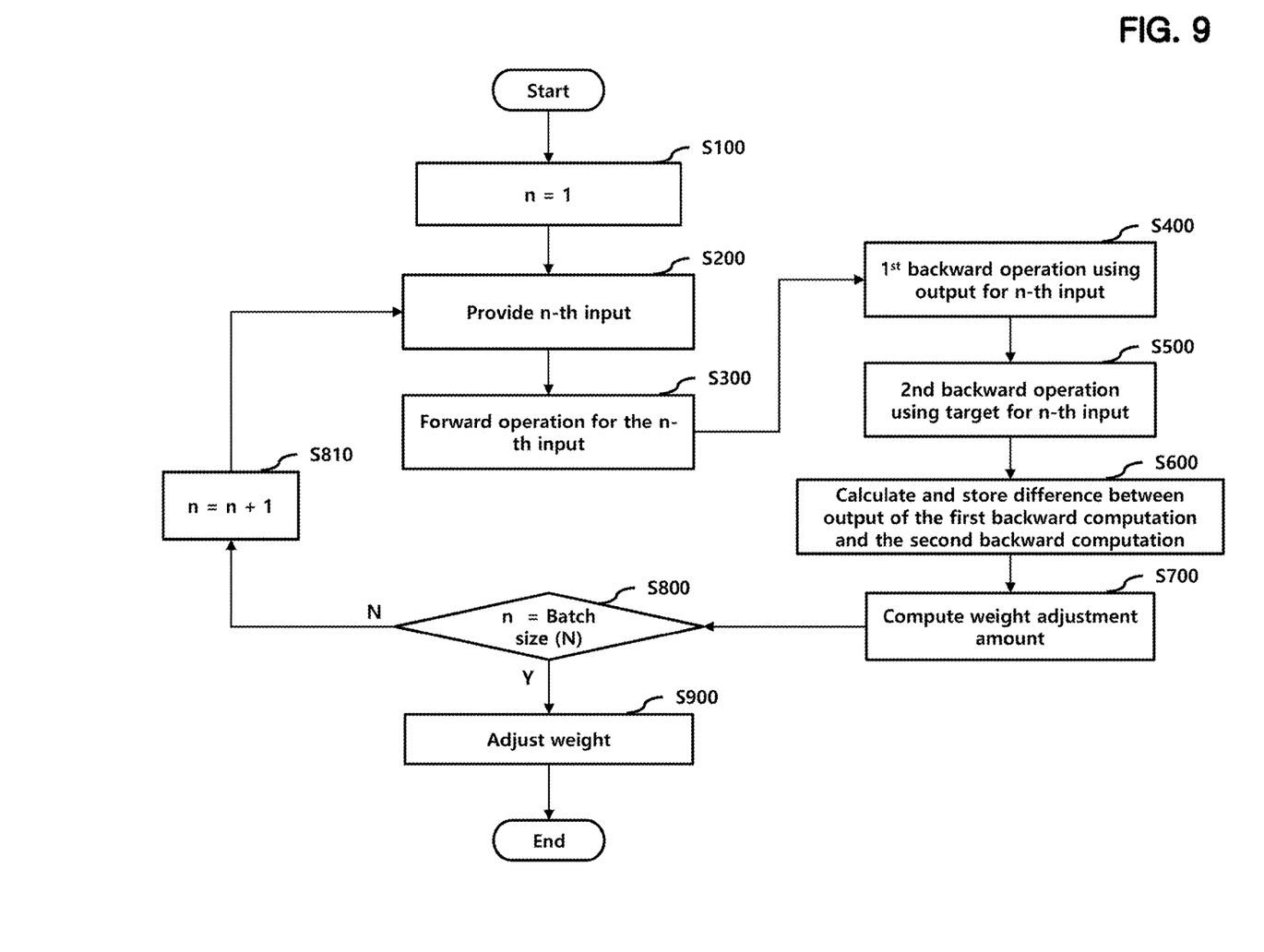
FIG. 9 illustrates a flowchart showing a learning operation of a neuromorphic system according to an embodiment.

FIG. 9 is a flowchart illustrating an operation of a neuromorphic system according to an embodiment of the present disclosure. The operation illustrated in FIG. 9 will be described with reference to FIG. 1.

In this embodiment, supervised learning is performed using a batch input signal including a certain number (N) of batch inputs.

The first input storage circuit 10 stores the N batch inputs of the batch input signal, and the second input storage circuit 500 stores all targets corresponding to the N batch inputs.

First, a variable n represents a batch index assigned to each of the N batch inputs, and is initialized to 1 at S100.

Next, the first input storage circuit 10 provides an n-th input among the N batch inputs at S200.

Next, a forward operation is performed on the n-th batch input at S300. The forward operation corresponds to operations performed by the first neuromorphic layer 100, the first operation circuit 20, the first output storage circuit 30, the second neuromorphic layer 200, the second output storage circuit 40, and the second operation circuit 50 as the n-th batch input corresponding to the batch index n is provided.

In this case, the first neuromorphic layer 100 and the second neuromorphic layer 200 each perform a forward operation.

The output O of the second operation circuit 50 is stored in the second input storage circuit 500. The output O is separately stored from the target T.

Thereafter, the second input storage circuit 500 provides an output O for the n-th batch input as a first backward input of the second neuromorphic layer 200 to perform a first backward operation at S400.

The first backward operation is performed in the second neuromorphic layer 200, and the result P of the first backward operation is temporarily stored in the third output storage circuit 600.

Thereafter, the second input storage circuit 500 provides a target T for the n-th batch input as a second backward input of the second neuromorphic layer 200 to perform a second backward operation at S500.

In this case, the second backward operation is performed in the second neuromorphic layer 200, and the result Q of the second backward operation is temporarily stored in the third output storage circuit 600.

Thereafter, the third output storage circuit 600 calculates and stores a difference, which corresponds to the error backpropagation signal R, between the first backward operation result P and the second backward operation result Q for the n-th batch input at S600.

Thereafter, weight adjustment amounts, e.g., the first weight adjustment amount ΔW1 and the second weight adjustment amount ΔW2, are calculated at S700.

The weight adjustment amount calculation is performed by the first weight adjustment amount calculation circuit 300 and the second weight adjustment amount calculation circuit 400.

A specific weight adjustment amount calculation operation will be described later with reference to FIGS. 7 and 8.

Thereafter, it is determined whether the variable n is equal to the batch size N at S800. If the variable n is not equal to the batch size N, the variable n is incremented at S810 and the process is proceeded to S200 to repeat aforementioned operations. If it is determined at S800 that the value n is equal to the batch size N, the weights, e.g., the first weight W1 and the second weight W2, are adjusted using the first and second weight adjustment amounts ΔW1 and ΔW2, respectively, at S900, and the process is terminated.

The weight adjustment operation is performed by the first weight adjusting circuit 700 and the second weight adjusting circuit 800, so that the first weight W1 of the first neuromorphic layer 100 and the second weight W2 of the second neuromorphic layer 200 are updated.

The weight adjustment amount calculation is finally determined after the forward and backward operations are finished for all the N batch inputs included in the batch input signal.

Accordingly, the weight adjustment amount calculation operation may be performed between S800 and S900.

In this case, the third output storage circuit 600 may store all the error backpropagation signals R corresponding to all the N batch inputs of the batch input signal.

As described above, in the present embodiment, the weight of the neuromorphic layer is adjusted through the supervised learning that performs forward operations and backward operations based on one batch input signal including N batch inputs.

In the embodiment shown in FIG. 1, it is assumed that there are two neuromorphic layers, but the number of neuromorphic layers may be increased.

In a case of including more than two neuromorphic layers, the first neuromorphic layer 100 may correspond to the first layer among the more than two neuromorphic layers and the second neuromorphic layer 200 may correspond to the last layer among the more than two neuromorphic layers, and another neuromorphic layer may be additionally included between the first neuromorphic layer 100 and the second neuromorphic layer 200.

In this case, a weight adjusting circuit and a weight adjusting amount calculation circuit may be added to correspond to the newly added neuromorphic layer, and elements corresponding to the first operation circuit 20, the first output storage circuit 30, and the third output storage circuit 600 of FIG. 1 may be further included for connection between neuromorphic layers to expand the neuromorphic system of FIG. 1.

Figure 2A:
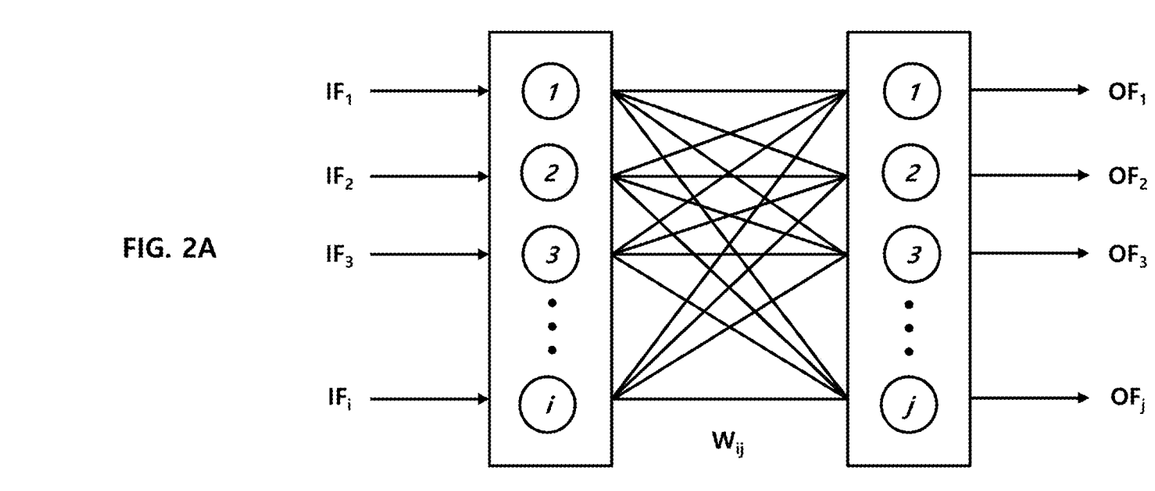
FIGS. 2A and 2B illustrate operations of a first neuromorphic layer according to an embodiment.
Figure 2B:
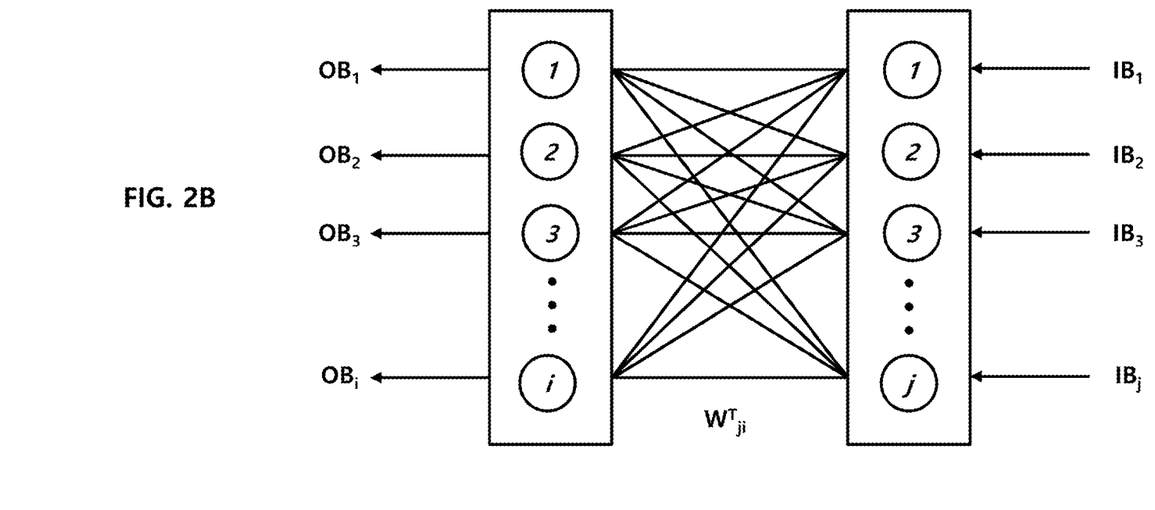

FIGS. 2A and 2B illustrate operations of the first neuromorphic layer 100 of FIG. 1.

FIG. 2A illustrates a forward operation performed by the first neuromorphic layer 100, and FIG. 2B illustrates a backward operation performed by the first neuromorphic layer 100.

A forward input signal IF may be represented by a vector having i elements, and a forward output signal OF may be represented by a vector having j elements, where i and j are natural numbers greater than 1. The forward input signal IF may correspond to the forward input signal X shown in FIG. 1, and the forward output signal OF may correspond to the forward output signal Y shown in FIG. 1.

A backward input signal IB may be represented by a vector having j elements, and a backward output signal OB may be represented by a vector having i elements.

In the present embodiment, the first weight W1 has a matrix structure including i rows and j columns.

The forward operation may be represented by Equation 1 below, and the backward operation may be represented by Equation 2 below.

When the first weight W1 has the matrix structure including i×j elements, each element of the first weight matrix may be represented as $W_{ij}$. The first weight W1 having the matrix structure may be referred to as a 'first weight matrix.'

In Equation 2, $W^T$ denotes a result of a transpose operation of W.

$$OF_j = \sum_{m=1}^{i} (IF_m \cdot W_{mj}) \qquad \text{[Equation 1]}$$

$$OB_i = \sum_{m=1}^{j} (IB_m \cdot W_{mi}^T) \qquad \text{[Equation 2]}$$

In the present embodiment, each element of the forward and backward input and output signals and each element of the first weight matrix may be a multi-bit digital signal that is a digital signal having multiple bits.

Figure 3:
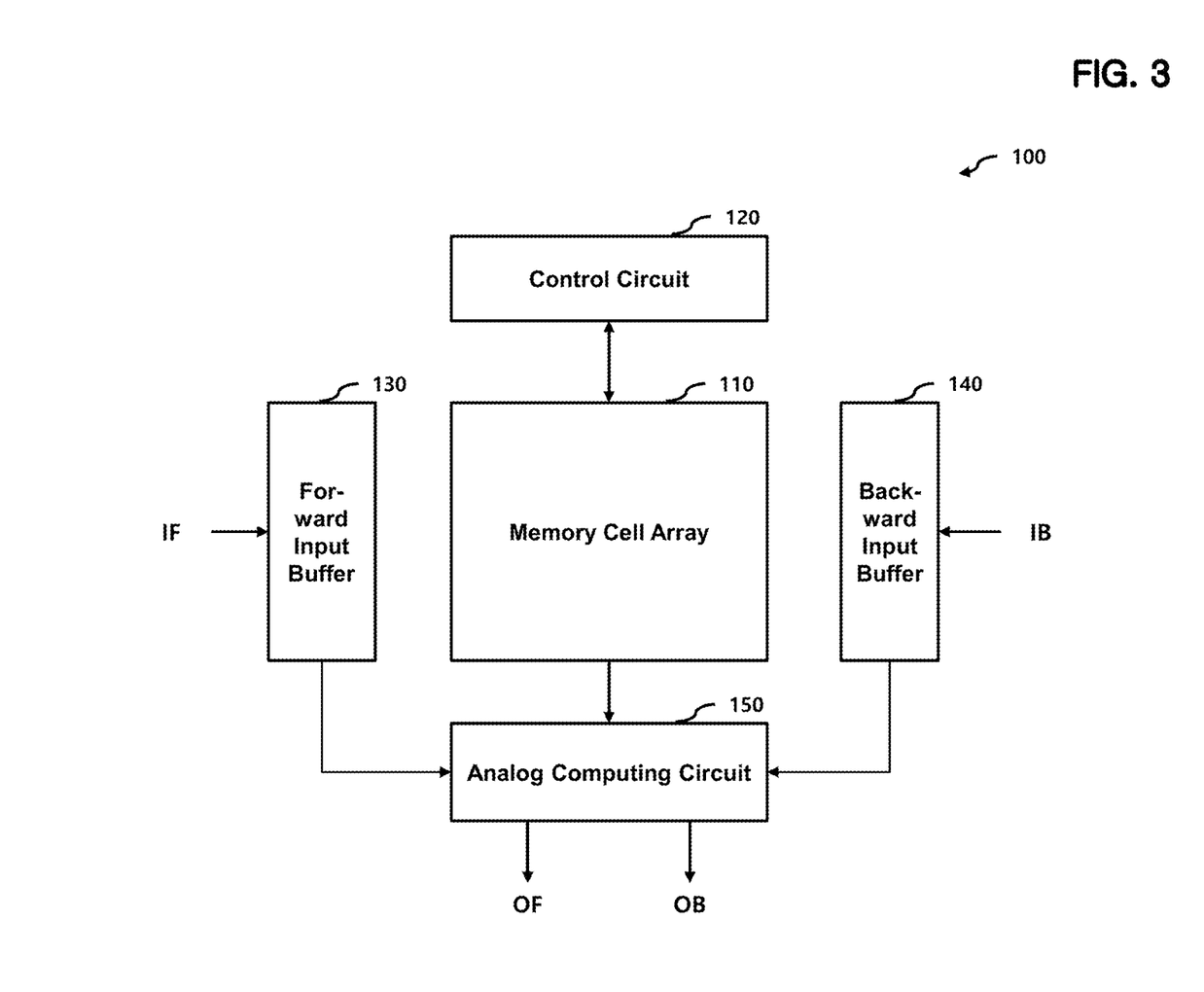
FIG. 3 illustrates a first neuromorphic layer according to an embodiment.

FIG. 3 illustrates the first neuromorphic layer 100 according to an embodiment of the present disclosure.

The first neuromorphic layer 100 includes a memory cell array 110, a control circuit 120, a forward input buffer 130, a backward input buffer 140, and an analog computing circuit 150.

The memory cell array 110 stores the first weight W1. The memory cell array 110 may be implemented with an SRAM, a DRAM, or another memory technology.

The control circuit 120 controls an operation of reading or writing each weight element of the first weight W1 from or in the memory cell array 110. The control circuit 120 may correspond to circuitry for controlling a read/write operation of a general memory device such as an SRAM, a DRAM, or the like.

The forward input buffer 130 may store the forward input signal IF, and the backward input buffer 140 may store the backward input signal IB.

The analog computing circuit 150 generates the forward output signal OF using the forward input signal IF and the first weight W1, as shown in Equation 1.

In addition, the analog computing circuit 150 generates the backward output signal OB using the backward input signal IB and the first weight W1, as shown in Equation 2.

Figure 4:
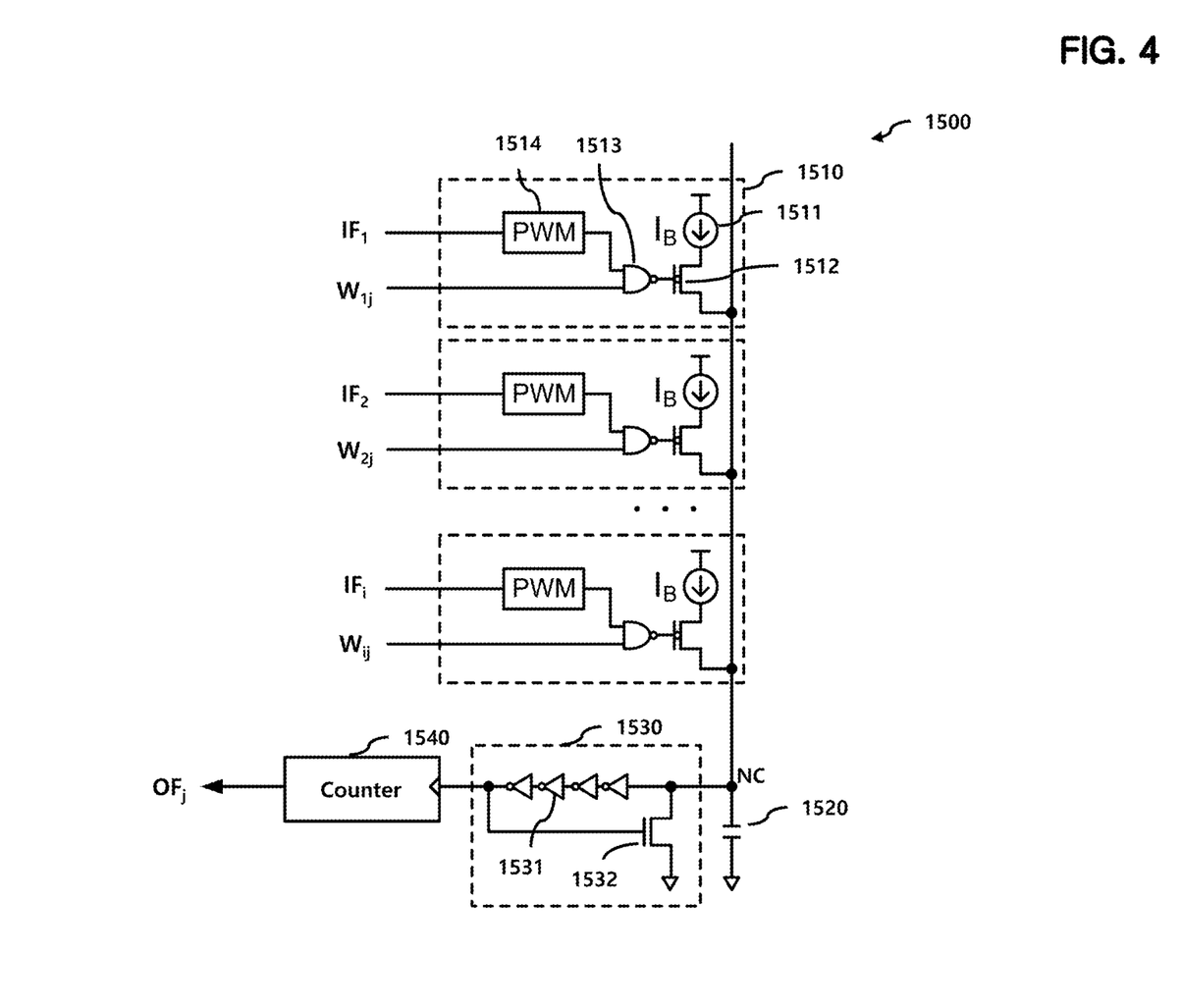
FIGS. 4 and 5 illustrate an analog computing circuit according to an embodiment.

FIG. 4 illustrates a forward analog computing circuit 1500 for implementing Equation 1 according to an embodiment. The forward analog computing circuit 1500 may be included in the analog computing circuit 150 shown in FIG. 3.

The forward analog computing circuit 1500 includes a plurality of multiplication circuits 1510, a capacitor 1520, a pulse generation circuit 1530, and a counter 1540.

An m-th multiplication circuit among the plurality of multiplication circuits 1510 receives a forward input signal $IF_m$ and a weight element $W_{mj}$ (1≤m≤i, i≥2).

Since the plurality of multiplication circuits 1510 have substantially the same structure, the multiplication circuits 1510 are described with reference to the multiplication circuit 1510 corresponding to m=1.

The multiplication circuit 1510 includes a pulse width modulation (PWM) circuit 1514 for pulse-width-modulating the forward input signal IF1, a NAND gate 1513 for performing a NAND operation on a weight element and an output of the PWM circuit 1514, a current source 1511, and a PMOS transistor 1512. The PMOS transistor has a gate receiving an output of the NAND gate 1513, a source connected to the current source 1511, and a drain connected to a charging node NC.

The multiplication circuit 1510 charges the capacitor 1520 through the charging node NC only when the weight element is at a high level.

At this time, an amount of charges increases while the output of the PWM 151 is at a high level.

In the present embodiment, the forward input signal $IF_1$ is a multi-bit digital signal and the output of the PWM circuit 1514 generates a pulse signal having a wider high-level time, that is, a higher duty ratio, as the forward input signal $IF_1$ has a larger value.

As such, an amount of charges that is provided to the capacitor 1520 by each multiplication circuit 1510 corresponds to the product of a forward input signal and a corresponding weight element, and the amount of charges stored in the capacitor 1520 corresponds to the dot product of the forward input vector IF and the weight vector $W_j$.

The amount of charges stored in the capacitor 1520 is converted into a forward output signal $OF_j$ in the digital form through the pulse generation circuit 1530 and the counter 1540.

The pulse generation circuit 1530 may include a delay circuit 1531 that generates a high-level signal when a voltage of the charging node NC rises to a predetermined level and a discharge circuit 1532 for discharging the charging node NC when an output of the delay circuit 1531 becomes a high level.

In this embodiment, the delay circuit 1531 includes an inverter chain, and the discharge circuit 1532 includes an NMOS transistor having a gate receiving the output of the delay circuit 1531 and a source and a drain connected in parallel to the capacitor 1520.

Accordingly, as an amount of charges stored in the charging node NC per unit time increases, the pulse generation circuit 1530 generates a larger number of pulses.

The counter 1540 counts the number of pulses generated by the pulse generation circuit 1530 and provides a digital signal corresponding to the number of pulses as the forward output signal $OF_j$.

Figure 5:
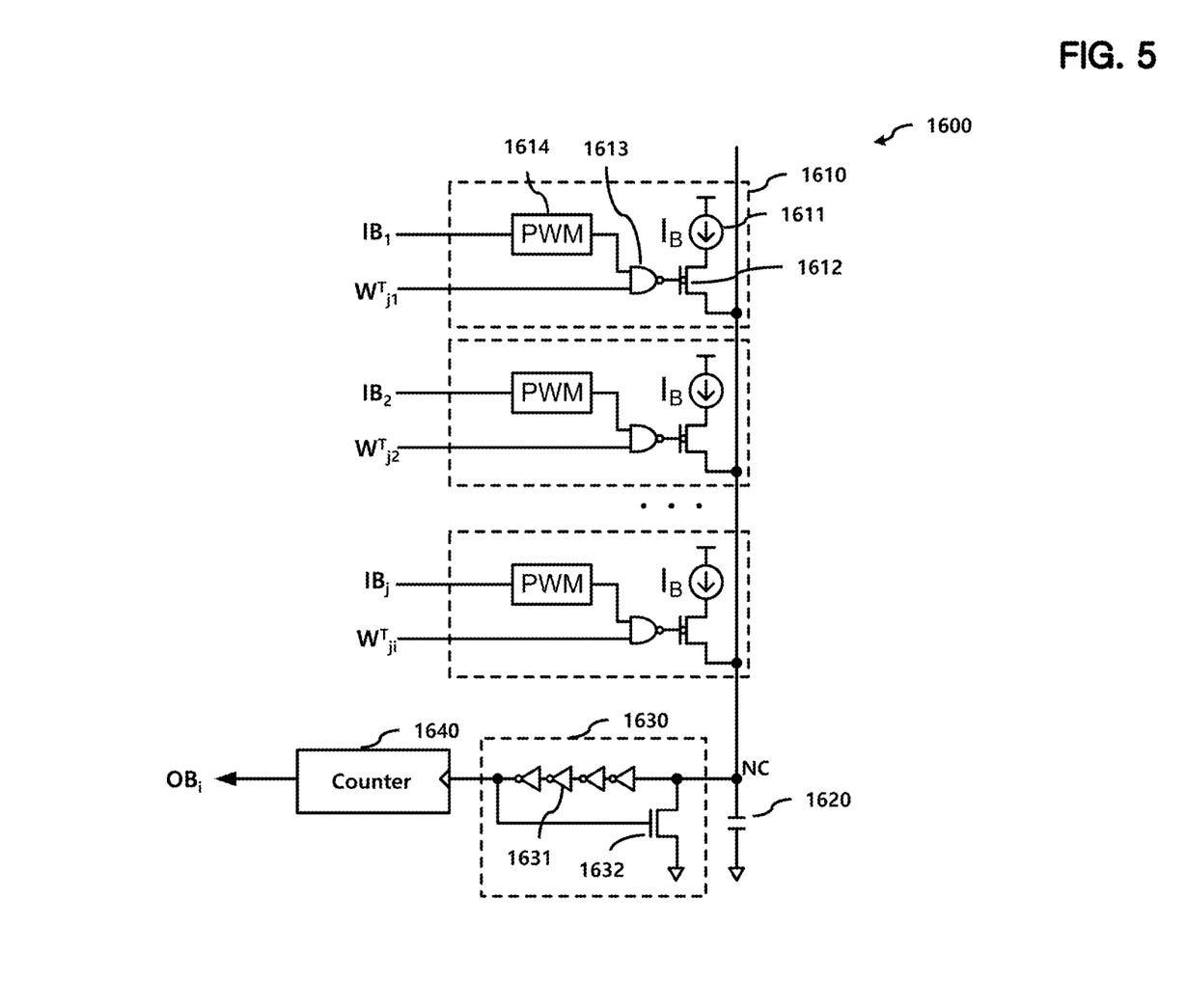

FIG. 5 illustrates a backward analog computing circuit 1600 for implementing Equation 2 according to an embodiment. The backward analog computing circuit 1600 may be included in the analog computing circuit 150 shown in FIG. 3.

The backward analog computing circuit 1600 includes a plurality of multiplication circuits 1610, a capacitor 1620, a pulse generation circuit 1630, and a counter 1640.

Since the backward analog computing circuit 1600 has substantially the same configuration as the above-described forward analog computing circuit 1500 shown in FIG. 4 except that only input and output signals are changed to backward analog computing related signals, e.g., IB, $W^T$, and OB, a detailed description thereof is omitted.

Figure 6A:
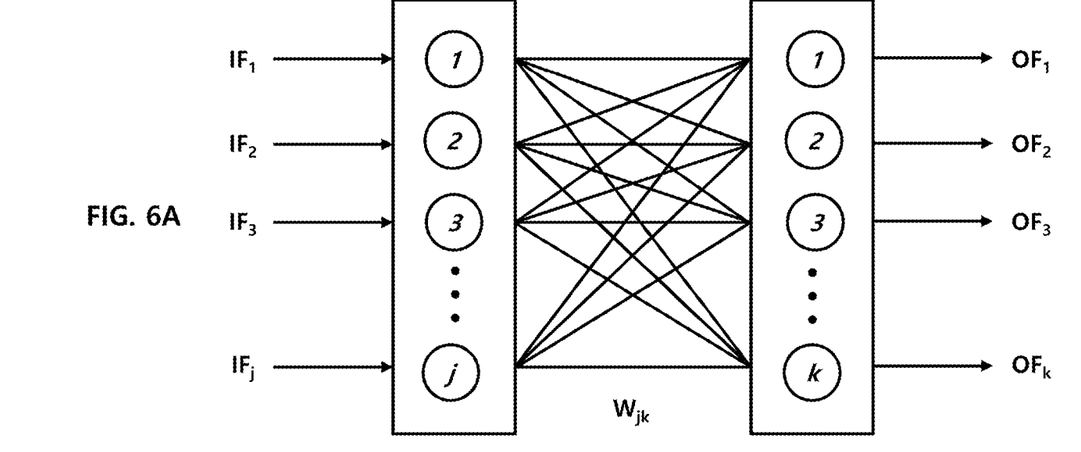
FIGS. 6A and 6B illustrate operations of a second neuromorphic layer according to an embodiment.
Figure 6B:
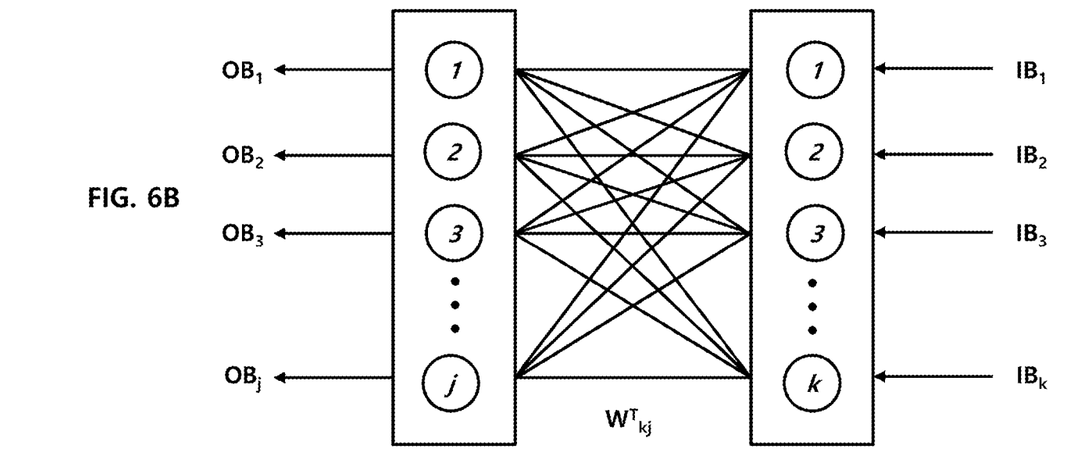

FIGS. 6A and 6B illustrate operations of the second neuromorphic layer 200 of FIG. 1.

FIG. 6A illustrates a forward operation performed by the second neuromorphic layer 200, and FIG. 6B illustrates a backward operation performed by the second neuromorphic layer 200.

Since the second neuromorphic layer 200 has substantially the same configuration as the first neuromorphic layer 100 shown in FIG. 3, a detailed description thereof is omitted.

When the second weight W2 has a matrix structure including j×k elements, each weight element of the second weight W2 may be represented by $W_{jk}$. Since the configuration and the forward and backward operations performed by the second neuromorphic layer 200 are substantially the same as the configuration and the forward and backward operations of the first neuromorphic layer 100 described above with reference to FIGS. 2A, 2B, 3, 4, and 5, detailed descriptions thereof are omitted.

Hereinafter, the weight adjustment amount calculation operation performed by the first and second weight adjustment amount calculation circuits 300 and 400 will be described with reference to FIGS. 7 and 8.

As described above, the weight adjustment amount is determined after the forward operations and the backward operations for the N batch inputs of the batch input signal are completed.

In the flowchart of FIG. 9, a weight adjustment amount is calculated and updated by performing a forward operation and a backward operation on each of the N batch inputs of the batch input signal that corresponds to each batch index, and finally determined by performing a forward operation and a backward operation on the N-th batch input of the batch input signal.

In another embodiment, the weight adjustment amount may be calculated after forward and backward operations on all the N batch inputs included in the batch input signal are completed.

In either case, the weight adjustment amount calculation method itself is the same.

Figure 7:
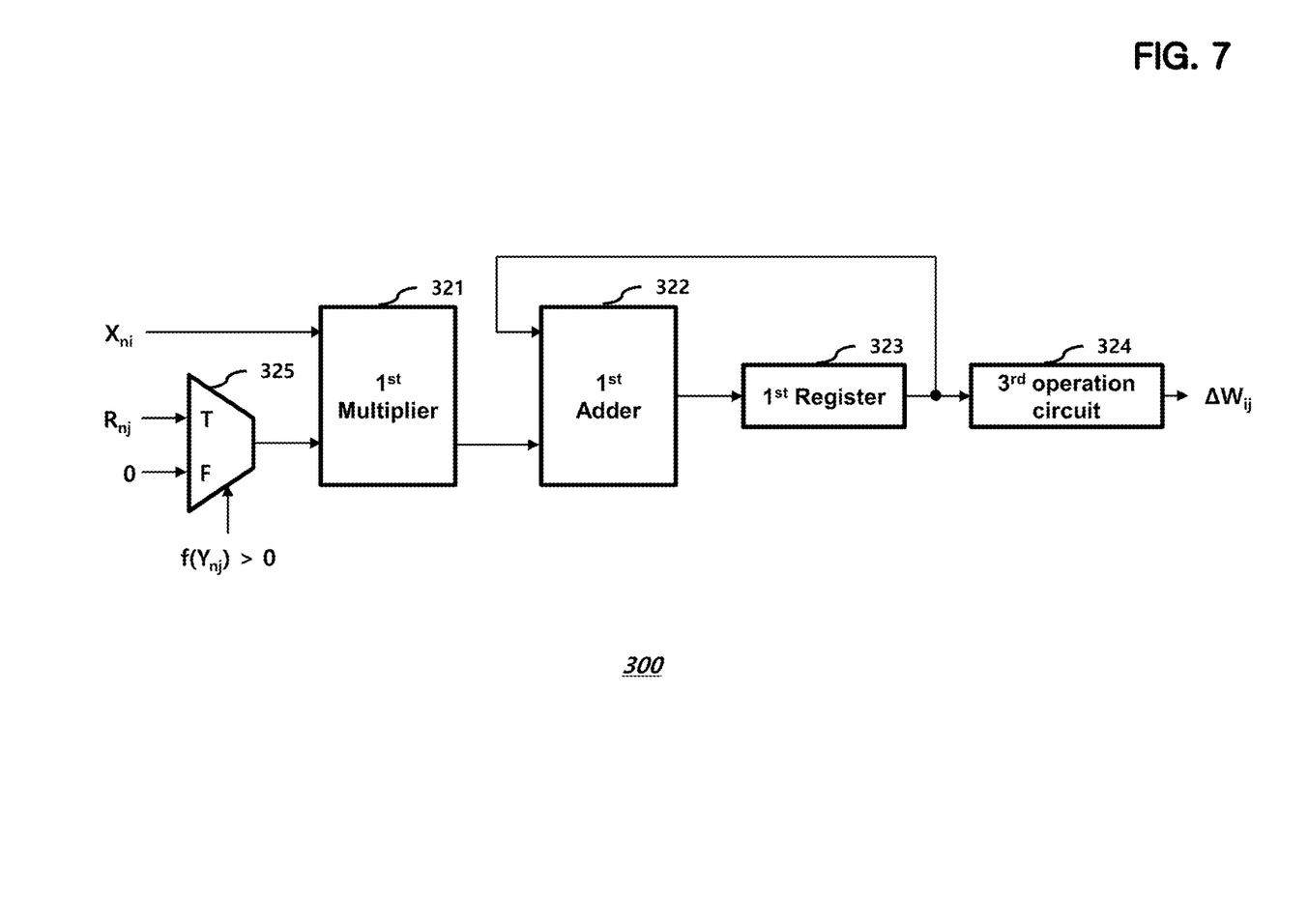
FIG. 7 illustrates a first weight adjustment amount calculation circuit according to an embodiment.

FIG. 7 illustrates the first weight adjustment amount calculation circuit 300 of FIG. 1 according to an embodiment.

In FIG. 7, it is assumed that the first weight adjustment amount calculation circuit 300 calculates the weight adjustment amount $\Delta W_{ij}$ for the i, j-th element of the first weight matrix, that is, $W_{ij}$.

The first weight adjustment amount calculation circuit 300 includes a first multiplier 321, a first adder 322, a first register 323, and a third operation circuit 324.

The first weight adjustment amount calculation circuit 300 further includes a multiplexer 325.

The first adder 322 and the first register 323 accumulate results of multiplying a forward operation result X and a backward operation result R for each batch input included in the batch input signal.

For example, when a multiplication result corresponding to the n-th batch input is provided, the first adder 322 adds the (n−1)-th addition result stored in the first register 323 and the multiplication result and updates the first register 323 with an output of the first adder 322.

The first multiplier 321 multiplies the i-th element $X_{ni}$ of the n-th input signal $X_n$ stored in the first input storage circuit 10 by an output of the multiplexer 325.

The multiplexer 325 selects a j-th element of an error backpropagation signal $R_{nj}$ output from the third output storage circuit 600 that corresponds to the n-th batch input if a value of a j-th element $f(Y_{nj})$ of the signal f(Y) output from the first output storage circuit 30 that corresponds to the n-th batch input is greater than 0, and selects 0 if otherwise.

As described above with reference to FIG. 1, the third output storage circuit 600 stores the results P and Q of the first and second backward operations of the second neuromorphic layer 200.

The results of the first and second backward operations are given by the error backpropagation signal R which is the difference between the first backward operation result P and the second backward operation result Q. The backward operation result P is generated when the output O of the second operation circuit 50 is input to the second neuromorphic layer 200, and the second backward operation result Q is generated when the target T is input to the second neuromorphic layer 200.

The third output storage circuit 600 stores the first backward calculation result P and the second backward calculation result Q in correspondence with each batch input included in the batch input signal, or only the error backpropagation signal R corresponding to the difference may be stored in the third output storage circuit 600.

After multiplication and addition have been completed for all batch inputs included in the batch input signal, the third operation circuit 324 calculates the weight adjustment amount for the first weight W1 according to a final value of the first register 323.

When only some bits of the i-th element $X_{ni}$ of the n-th input signal $X_n$ and the j-th element $R_{nj}$ of the error backpropagation signal R output from the third output storage circuit 600 are used to calculate the weight adjustment amount for the first weight W1, the complexity of hardware may be reduced.

For example, if the i-th element $X_{ni}$ of the n-th input signal $X_n$ is a unsigned 8-bit signal and the j-th element $R_{nj}$ of the error backpropagation signal R is a signed 9-bit signal, hardware using upper three bits of the n-th element $X_{ni}$ of the n-th input signal $X_n$ and upper four bits of the j-th element $R_{nj}$ of the error backpropagation signal R may be used to reduce the complexity.

In an embodiment, the third operation circuit 324 may output +1 when the final value of the first register 323 is greater than 0, 0 when the final value is 0, and −1 when the final value is less than 0, as the weight adjustment amount $\Delta W_{ij}$ for the i, j-th element of the first weight W1.

When the weight adjustment amount $\Delta W_{ij}$ is expressed with two bits, +1 may be represented as "01," 0 may be represented as "00," and −1 may be represented as "11."

The first weight adjusting circuit 700 stores the weight adjustment amount ΔW1 for each element provided by the first weight adjustment amount calculation circuit 300 and updates each element of the first weight W1 by adding the weight adjustment amount ΔW1.

As described above with reference to FIG. 3, in the first neuromorphic layer 100, the first weight W1 is stored in the memory cell array 110, and reading and writing the first weight W1 may be performed by the control circuit 120.

Figure 8:
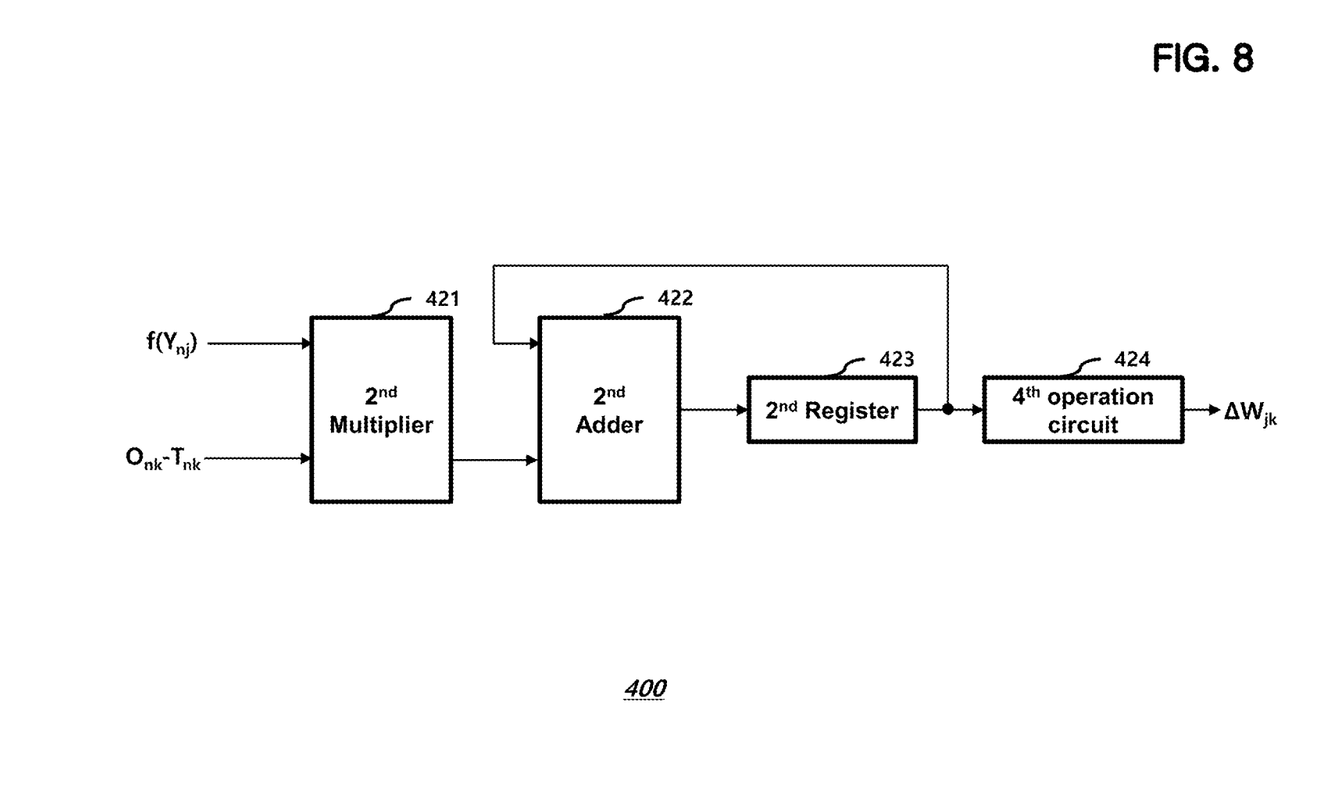
FIG. 8 illustrates a second weight adjustment amount calculation circuit according to an embodiment.

FIG. 8 illustrates the second weight adjustment amount calculation circuit 400 of FIG. 1 according to an embodiment.

In FIG. 8, it is assumed that the second weight adjustment amount calculation circuit 400 calculates the weight adjustment amount $\Delta W_{jk}$ for the j,k-th element of the second weight W2, that is, $W_{jk}$.

The second weight adjustment amount calculation circuit 400 includes a second multiplier 421, a second adder 422, a second register 423, and a fourth operation circuit 424.

The second adder 422 and the second register 423 accumulate results of multiplying a forward operation result f(Y) and a backward operation result (O−T) for each batch input included in the batch input signal.

For example, when a multiplication result corresponding to the n-th batch input is provided, the second adder 422 adds the (n−1)-th addition result stored in the second register 423 and the multiplication result, and updates the second register 423 with an output of the second adder 422.

The second multiplier 421 multiplies the j-th element $f(Y_{nj})$ of the output signal $f(Y_n)$ output from the first output storage circuit 30 that corresponds to the n-th batch input included in the batch input signal by a k-th element $(O_{nk}-T_{nk})$ of an error signal, which is a difference between an output signal $O_n$ and a target $T_n$ corresponding to the n-th batch input included in the batch input signal.

When only some bits of the j-th element $f(Y_{nj})$ of the output signal of the first storage circuit 30 and the k-th element $(O_{nk}-T_{nk})$ of the error signal are used to calculate the weight adjustment amount for the second weight W2, the complexity of hardware may be reduced.

For example, if the j-th element $f(Y_{nj})$ of the output signal $f(Y_n)$ of the first storage circuit 30 is a unsigned 8-bit signal and the k-th element $(O_{nk}-T_{nk})$ of the error signal is a signed 9-bit signal, hardware using upper three bits of the j-th element $f(Y_{nj})$ and upper four bits of the k-th element $(O_{nk}-T_{nk})$ may be used to reduce the complexity.

After multiplication and addition have been completed for all batch inputs included in the batch input signal, the fourth calculation circuit 424 calculates the adjustment amount ΔW2 for the second weight W2 according to a final value of the second register 423.

In an embodiment, the fourth operation circuit 424 may output +1 when the final value of the second register 423 is greater than 0, 0 when the final value is 0, and −1 when the final value is less than 0, as the weight adjustment amount $\Delta W_{jk}$ for the j, k-th element of the second weight W2.

When the weight adjustment amount $\Delta W_{jk}$ is expressed with two bits, +1 may be represented as "01," 0 may be represented as "00," and −1 may be represented as "11."

The second weight adjusting circuit 800 stores the weight adjustment amount ΔW2 for each element provided by the second weight adjustment amount calculation circuit 400, and updates each element of the second weight W2 by adding the weight adjustment amount ΔW2.

In FIG. 1, the difference between the output O of the second operation circuit 50 and the target T corresponds to the error signal (O−T).

In the present embodiment, the above-described batch learning may be repeatedly performed so that the sum of the error signals generated in one batch input signal is equal to or less than a predetermined threshold value.

In general, analog computing circuits used in neuromorphic layers may be affected by noise, process variation, and so on. However, according to the embodiments of the present disclosure, by repeatedly performing the supervised learning using a plurality of batch inputs include in a batch input signal, the effects of noise, process variation, and so on may be reduced.

Although various embodiments have been described for illustrative purposes, it will be apparent to those skilled in the art that various changes and modifications may be made to the described embodiments without departing from the spirit and scope of the disclosure as defined by the following claims.

What is claimed is:

1. A neuromorphic system comprising:
   a first neuromorphic layer configured to perform a forward operation with an input signal and a first weight;
   a first operation circuit configured to perform a first operation on a result of the forward operation of the first neuromorphic layer;
   a second neuromorphic layer configured to perform a forward operation with an output signal of the first operation circuit and a second weight;
   a second operation circuit configured to perform a second operation on a result of the forward operation of the second neuromorphic layer;

a first weight adjustment amount calculation circuit configured to calculate a first weight adjustment amount based on the input signal, the output signal of the first operation circuit, and a result of a backward operation performed by the second neuromorphic layer, the backward operation being performed with a target signal corresponding to the input signal, an output signal of the second operation circuit, and the second weight; and a second weight adjustment amount calculation circuit configured to calculate a second weight adjustment amount based on the target signal corresponding to the input signal, the output signal of the second operation circuit, and the output signal of the first operation circuit, wherein the second neuromorphic layer performs a first backward operation with the target signal and the second weight to generate a first backward operation result and a second backward operation with the output signal of the second operation circuit and the second weight to generate a second backward operation result, and wherein the first weight adjustment amount calculation circuit calculates the first weight adjustment amount using a difference between the first backward operation result and the second backward operation result, the output signal of the first operation circuit, and the input signal.

2. The neuromorphic system if claim 1, further comprising:
a first wright adjusting circuit configured to adjust the first weight according to the first weight adjustment amount; and
a second weight adjusting circuit configured to adjust the second weight according to the second weight adjustment amount.

3. The neuromorphic system of claim 1, further comprising an output storage circuit for storing the first backward operation result and the second backward operation result or the difference between the first backward operation result and the second backward operation result.

4. The neuromorphic system of claim 1, further comprising:
a first input storage circuit configured to store a batch input signal including a plurality of batch inputs and to provide an n-th batch input in the batch input signal that corresponds to an n-th batch index assigned to the n-th batch input as the input signal, n being a natural number;
a first output storage circuit configured to store an output signal of the first operation circuit corresponding to the n-th batch input;
a second output storage circuit configured to store a result of the forward operation of the second neuromorphic layer corresponding to the n-th batch input;
a second input storage circuit configured to store a target signal corresponding to the n-th batch input and an output signal of the second operation circuit corresponding to the n-th batch input; and
a third output storage circuit configured to store a result of the backward operation of the second neuromorphic layer corresponding to the n-th batch input.

5. The neuromorphic system of claim 4, wherein the third output storage circuit stores an error backpropagation signal corresponding to the difference between the first backward operation result and the second backward operation result, the first backward operation result being generated by the first backward operation performed by the second neuromorphic layer using the target signal corresponding to the n-th batch input and the second weight, the second backward operation result being generated by the second backward operation performed by the second neuromorphic layer using the output signal of the second operation circuit corresponding to the n-th batch input and the second weight.

6. The neuromorphic system of claim 5, wherein the first weight adjustment amount calculation circuit includes:
a multiplexer configured to select zero or the error backpropagation signal corresponding to the n-th batch input according to the output signal of the first operation circuit corresponding to the n-th batch input;
a first multiplier configured to multiply an output of the multiplexer by the n-th batch input;
a first adder configured to accumulate an output of the first multiplier for the plurality of batch inputs in a first register; and
a third operation circuit configured to determine the first weight adjustment amount according to a final output value of the first register after the outputs of the first multiplier for the plurality of batch inputs are accumulated.

7. The neuromorphic system of claim 6, wherein the first multiplier selects a predetermined number of upper bits of the error backpropagation signal and a predetermined number of upper bits of the input signal when each of the error backpropagation signal and the input signal includes multiple bits.

8. The neuromorphic system of claim 6, wherein the third operation circuit determines +1 as the first weight adjustment amount when the final output value of the first register is positive, 0 as the first weight adjustment amount when the final output value of the first register is 0, and −1 as the first weight adjustment amount when the final output value of the first register is negative.

9. The neuromorphic system of claim 4, wherein the second weight adjustment amount calculation circuit includes:
a second multiplier configured to multiply the output signal of the first operation circuit by an error signal corresponding to a difference between the target signal corresponding to the n-th batch input and the output signal of the second operation circuit corresponding to the n-th batch input;
a second adder configured to accumulate an output of the second multiplier for the plurality of batch inputs in a second register; and
a fourth operation circuit configured to determine the second weight adjustment amount according to a final output value of the second register after the outputs of the second multiplier for the plurality of batch inputs are accumulated.

10. The neuromorphic system of claim 9, wherein the second multiplier selects a predetermined number of upper bits of the error signal and a predetermined number of upper bits of the output signal of the first operation circuit when each of the error signal and the output signal of the first operation circuit includes multiple bits.

11. The neuromorphic system of claim 9, wherein the fourth operation circuit determines +1 as the second weight adjustment amount when the final output value of the second register is positive, 0 as the second weight adjustment amount when the final output value of the second register is 0, and −1 as the second weight adjustment amount when the final output value of the second register is negative.

12. The neuromorphic system of claim 1, wherein the first neuromorphic layer includes:
   a memory cell array storing the first weight;
   a control circuit configured to write the first weight in the memory cell array or read the first weight from the memory cell array; and
   an analog computing circuit configured to generate a forward output signal based on a forward input signal and the first weight and to generate a backward output signal based on a backward input signal and the first weight.

13. The neuromorphic system of claim 12, wherein the first neuromorphic layer further includes a forward input buffer for storing the forward input signal and a backward input buffer for storing the backward input signal.

14. The neuromorphic system of claim 12, wherein the analog computing circuit includes a forward analog computing circuit configured to generate the forward output signal using the forward input signal with the first weight and a backward analog computing circuit configured to generate the backward output signal using the backward input signal with the first weight.

15. The neuromorphic system of claim 14, wherein the forward analog computing circuit includes:
   a multiplication circuit configured to generate a current corresponding to a multiplication result obtained by multiplying the forward input signal by the first weight and to provide the current to a charging node;
   a pulse generation circuit configure to generate a pulse signal corresponding to an amount of charges provided to the charging node; and
   a counter configured to generate the forward output signal by counting a number of pulses of the pulse signal.

16. The neuromorphic system of claim 15, wherein the multiplication circuit includes:
   a current source;
   a pulse width modulation (PWM) circuit configured to generate a signal having a duty ratio corresponding to a magnitude of a high level of the forward input signal; and
   a switch configured to connect the current source to the charging node in response to a result of a logic operation that is performed on the first weight and an output of the PWM circuit.

17. The neuromorphic system of claim 15, wherein the pulse generation circuit includes a delay circuit configured to generate a high-level signal when a voltage of the charging node rises above a predetermined level, and a discharging circuit configured to discharge the charging node when an output of the delay circuit enables the discharging circuit.

18. The neuromorphic system of claim 15, further comprising a capacitor connected between the charging node and a ground terminal.

19. The neuromorphic system of claim 15, wherein the forward input signal is a vector including a plurality of elements and the first weight has a matrix structure including a plurality of weight elements,
   wherein the forward analog computing circuit includes a plurality of multiplication circuits commonly connected to the charging node, and
   wherein each of the plurality of multiplication circuits receives a corresponding one of the plurality of elements of the forward input signal and a corresponding one of the plurality of weight elements of the first weight.

* * * * *